United States Patent
Ryu

(10) Patent No.: US 11,355,765 B2
(45) Date of Patent: Jun. 7, 2022

(54) COOLING CONTROL SYSTEM AND METHOD FOR FUEL CELLS

(71) Applicants: Hyundai Motor Company, Seoul (KR); Kia Motors Corporation, Seoul (KR)

(72) Inventor: Jung Hwan Ryu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 194 days.

(21) Appl. No.: 16/747,763

(22) Filed: Jan. 21, 2020

(65) Prior Publication Data

US 2021/0104761 A1    Apr. 8, 2021

(30) Foreign Application Priority Data

Oct. 8, 2019 (KR) .................. 10-2019-0124601

(51) Int. Cl.
| | |
|---|---|
| *H01M 8/04701* | (2016.01) |
| *H01M 8/04029* | (2016.01) |
| *H01M 8/04746* | (2016.01) |
| *H01M 8/04992* | (2016.01) |
| *H01M 8/0432* | (2016.01) |

(52) U.S. Cl.
CPC ... *H01M 8/04701* (2013.01); *H01M 8/04029* (2013.01); *H01M 8/04358* (2013.01); *H01M 8/04768* (2013.01); *H01M 8/04992* (2013.01)

(58) Field of Classification Search
None
See application file for complete search history.

(56) References Cited

U.S. PATENT DOCUMENTS

2009/0035613 A1* 2/2009 Chikugo ......... H01M 8/04029
429/430

FOREIGN PATENT DOCUMENTS

| KR | 10-1628514 B1 | 6/2016 |
|---|---|---|
| KR | 10-1724883 B1 | 4/2017 |
| KR | 10-2018-0070398 A | 6/2018 |

* cited by examiner

*Primary Examiner* — Haroon S. Sheikh
(74) *Attorney, Agent, or Firm* — Fox Rothschild LLP

(57) ABSTRACT

A cooling control system and method for fuel cells are provided. The cooling control system includes a fuel cell, a cooling circulation line connected to the fuel cell to circulate cooling water for cooling the fuel cell therein and a cooling water pump provided on the cooling circulation line to adjust a circulation amount of the cooling water. A calculation unit calculates a thermal energy change of the fuel cell based on a heating value and an amount of radiant heat of the fuel cell. A controller operates the cooling water pump based on the calculated thermal energy change of the fuel cell.

14 Claims, 5 Drawing Sheets

COOLING CONTROL SYSTEM AND METHOD FOR FUEL CELLS

CROSS-REFERENCE TO RELATED APPLICATION

This application claims the priority benefit of Korean Patent Application No. 10-2019-0124601, filed on Oct. 8, 2019, the disclosure of which is incorporated herein by reference.

BACKGROUND

1. Field of the Invention

The present invention relates to a technology which operates a cooling water pump based on a thermal energy change of a fuel cell and an opening degree of a thermostat valve of a cooling circulation line.

2. Description of the Related Art

A fuel cell converts chemical energy into electrical energy using oxidation-reduction reactions of hydrogen and oxygen respectively supplied from a hydrogen supply apparatus and an oxygen supply apparatus. The fuel cell includes a fuel cell stack which produces electrical energy, a cooling system which cools the fuel cell stack, etc. In other words, hydrogen is supplied to an anode of the fuel cell stack, oxidation reaction of hydrogen is performed at the anode and thus produces protons and electrons, and the produced protons and electrons are moved to a cathode through an electrolyte membrane and a separator, respectively. The cathode produces water through electrochemical reaction in which the protons and electrons moved from the anode and oxygen in the air participate, and such electron flow generates electrical energy.

Due to such electrochemical reaction, thermal energy together with electrical energy is generated in the fuel cell stack. To prevent problems, such as degradation of the fuel cell stack caused by overheating due to such thermal energy, the fuel cell includes the cooling system. Particularly, a water cooling-type cooling system, in which a cooling flow path in which cooling water flows is formed between respective unit cells included in the fuel cell stack to cool the fuel cell stack, is mainly used.

In this cooling system, it is difficult to directly measure the temperature of the fuel cell stack, and thus, the temperature of the fuel cell stack is indirectly estimated using an outlet temperature of cooling water discharged from the fuel cell stack. Further, a cooling amount of the fuel cell stack is adjusted by operating a thermostat which adjusts a ratio between cooling water having passed through a radiator and cooling water having bypassed the radiator according to the estimated temperature of the fuel cell stack or a pump which circulates cooling water.

In other words, cooling water having passed through the radiator and cooling water having bypassed the radiator, which flow into the thermostat, are mixed, thus cooling the fuel cell stack. However, according to such a cooling control method, low-temperature cooling water having passed through the radiator may flow into the fuel cell stack, and thus, thermal impact may be applied to the fuel cell stack.

Further, since a minimal amount of heat is generated in the fuel cell stack, the radiator may not maintain heat radiation performance in a state in which a required amount of radiant heat is minimal, and thereby, if the required amount of radiant heat of the fuel cell stack is again increased, a time to exhibit cooling performance of the cooling system is delayed.

The above description has been provided to aid in understanding of the background of the present invention and should not be interpreted as conventional technology known to those skilled in the art.

SUMMARY

Therefore, the present invention provides a control system and method which control a cooling pump based on a cumulative heating value of a fuel cell and an opening degree of a thermostat valve of a cooling circulation line.

In accordance with an aspect of the present invention, a cooling control system for fuel cells may include a fuel cell, a cooling circulation line connected to the fuel cell to circulate cooling water for cooling the fuel cell therein, a cooling water pump provided on the cooling circulation line to adjust a circulation amount of the cooling water, a calculation unit configured to calculate a thermal energy change of the fuel cell based on a heating value and an amount of radiant heat of the fuel cell, and a controller configured to operate the cooling water pump based on the thermal energy change of the fuel cell calculated by the calculation unit.

The cooling control system for fuel cells may further include a heating value estimation unit configured to estimate the heating value of the fuel cell based on electric power generation information of the fuel cell. In addition, the cooling control system for fuel cells may include a first temperature sensor and a second temperature sensor configured to measure temperatures of the cooling water at an inlet and an outlet where the cooling circulation line and the fuel cell are connected.

The calculation unit may be configured to calculate the amount of radiant heat of the fuel cell based on the temperatures measured by the first temperature sensor and the second temperature sensor, and calculate the thermal energy change of the fuel cell based on a value acquired by subtracting the amount of radiant heat of the fuel cell from the heating value of the fuel cell.

The cooling control system for fuel cells may further include a heat exchanger provided on the cooling circulation line to exchange heat between the cooling water in the cooling circulation line and the outside, a bypass path provided in the cooling circulation line to allow the cooling water therein to bypass the heat exchanger, and a thermostat valve configured to adjust an amount of circulation of the cooling water circulated to the heat exchanger or the bypass path.

The controller may be configured to operate the cooling water pump based on an opening degree of the thermostat valve and the thermal energy change of the fuel cell. Additionally, the controller may be configured to operate the cooling water pump by adjusting a control gain value for adjusting a rotational speed of the cooling water pump based on the opening degree of the thermostat valve. The opening degree of the thermostat valve may be set based on an internal temperature of the fuel cell.

The controller may be configured to operate the cooling water pump to adjust a rotational speed of the cooling water pump to become a predetermined basic speed when the thermal energy change of the fuel cell is a predetermined thermal energy change or less. The controller may also be configured to stop the cooling water pump operation when the thermal energy change of the fuel cell is a predetermined thermal energy change or less and the predetermined thermal energy change is 0. The controller may be configured to increase rotational speed of the cooling water pump such when the thermal energy change of the fuel cell exceeds a predetermined thermal energy change.

In accordance with another aspect of the present invention, a cooling control method for fuel cells may include calculating a thermal energy change of a fuel cell based on an amount of radiant heat and a heating value of the fuel cell, and operating a cooling water pump based on the thermal energy change of the fuel cell, calculated in the calculating the thermal energy change of the fuel cell, and adjusting an opening degree of a thermostat valve.

The cooling control method for fuel cells may further include estimating the heating value of the fuel cell based on electric power generation information of the fuel cell. The cooling control method for fuel cells may further include measuring temperatures of the cooling water at an inlet and an outlet where the cooling circulation line and the fuel cell are connected. In calculating the thermal energy change, the amount of radiant heat of the fuel cell may be calculated based on the temperatures measured in the measuring the temperatures of the cooling water, and the thermal energy change of the fuel cell may be calculated based on a value acquired by subtracting the amount of radiant heat of the fuel cell from the heating value of the fuel cell.

In operating the cooling water pump, the cooling water pump may be operated by adjusting a control gain value for adjusting a rotational speed of the cooling water pump based on the opening degree of the thermostat valve. In addition, the cooling water pump operation may be stopped when the thermal energy change of the fuel cell is a predetermined thermal energy change or less and the predetermined thermal energy change is 0.

In operating the cooling water pump, the cooling water pump may be stopped when the thermal energy change of the fuel cell is a predetermined thermal energy change or less. The rotational speed of cooling water pump may be increased when the thermal energy change of the fuel cell exceeds a predetermined thermal energy change.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
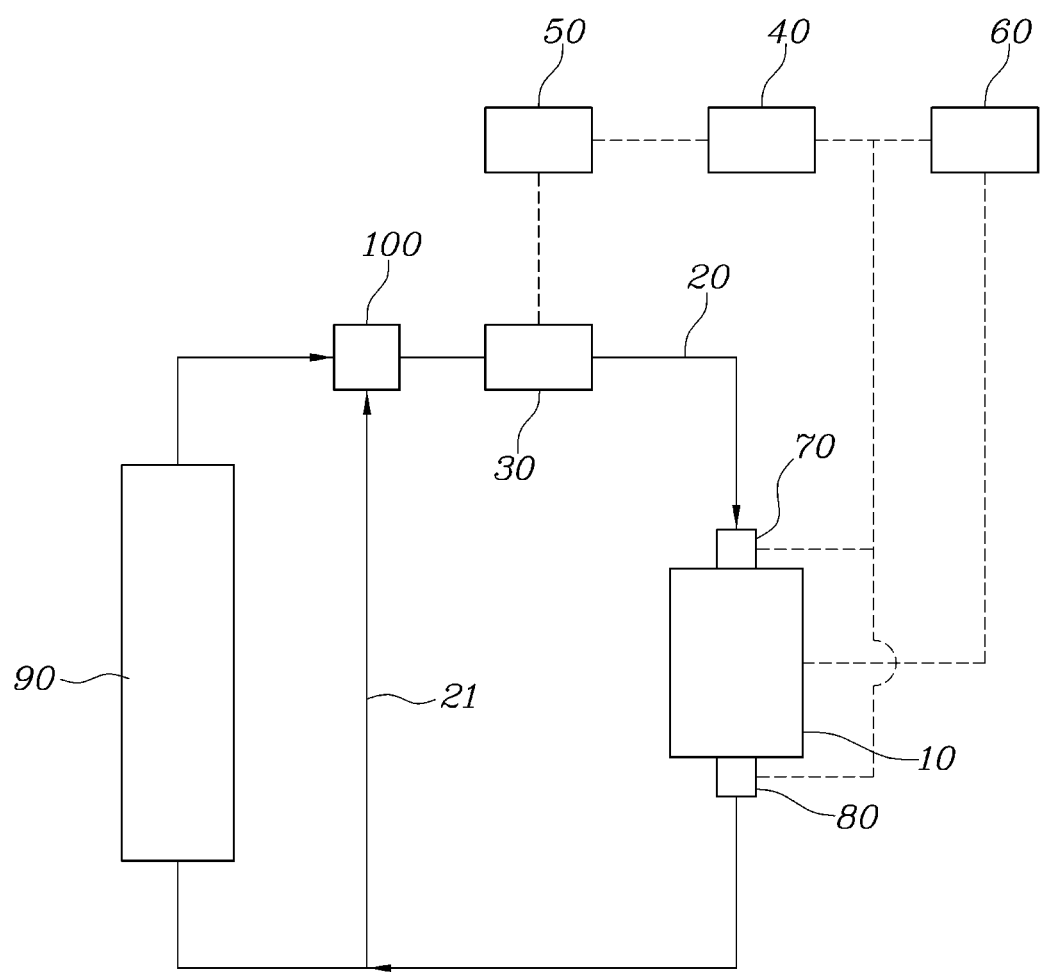
FIG. 1 is a block diagram of a cooling control system for fuel cells in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific structural or functional descriptions of exemplary embodiments of the present invention set forth in the description which follows will be exemplarily given to describe the embodiments of the present invention. However, the present invention may be embodied in many alternative forms, and should not be construed as being limited to the embodiments set forth herein.

The embodiments of the present invention may be variously modified and changed, and thus specific exemplary embodiments of the present invention will be illustrated in the drawings and described in detail in the following description of the exemplary embodiments of the present invention. However, the exemplary embodiments of the present invention are provided only to completely disclose the invention and to completely inform those skilled in the art of the scope of the invention.

In the following description of the embodiments, it will be understood that, when the terms "first", "second", etc. are used to describe various elements, these terms are not used to limit the elements. That is, these terms are used merely to distinguish the same or similar elements. For example, a first element may be named a second element and similarly a second element may be named a first element, within the technical scope of the invention, unless stated otherwise.

In the following description of the exemplary embodiments, it will be understood that, when an element is "connected to", "coupled to", etc. another element, the two elements may be directly connected or coupled, or one or more other elements may be interposed between the two elements. On the other hand, it will be understood that, when an element is "directly connected to", "directly coupled to", etc. another element, no elements may be interposed between the two elements. In the following description of the embodiments, other terms expressing relations between elements, such as "between" and "directly between" or "adjacent to" and "directly adjacent to", will be interpreted in the same manner.

It will be understood that terms used in the following description of the exemplary embodiments are used only to describe specific embodiments and are not intended to limit the invention, and a singular expression of an element encompasses a plural expression of the element, unless stated otherwise. In the following description of the exemplary embodiments, terms "including", "having", etc. will be interpreted as indicating presence of characteristics, numbers, steps, operations, elements or parts stated in the specification or combinations thereof, and do not exclude presence of one or more characteristics, numbers, steps, operations, elements, parts or combinations thereof, or a possibility of adding the same.

It will be understood that all terms, including technical or scientific terms, used in the following description of the exemplary embodiments have the same meanings as those which are generally understood by those skilled in the art, unless defined otherwise. Also, it will be interpreted that terms defined in generally used dictionaries have meanings coinciding with contextual meanings in the related art, and do not have ideal or excessively formal meanings unless clearly defined.

Hereinafter, reference will be made in detail to the exemplary embodiments of the present invention, examples of which are illustrated in the accompanying drawings. In the following description of the exemplary embodiments and the drawings, the same or similar elements are denoted by the same reference numerals even when they are depicted in different drawings.

A calculation unit 40, a heating value estimation unit 60 and a controller 50 in accordance with the exemplary embodiments of the present invention may be implemented through an algorithm configured to execute operations of various components of a vehicle or a non-volatile memory (not shown) configured to store data regarding software commands to execute the algorithm and a processor (not shown) configured to perform operations which will be described below, using the data stored in the corresponding memory. Here, the memory and processor may be implemented as separate chips. Alternatively, the memory and processor may be implemented as a single integrated chip. Here, one or more processors may be provided.

Figure 2:
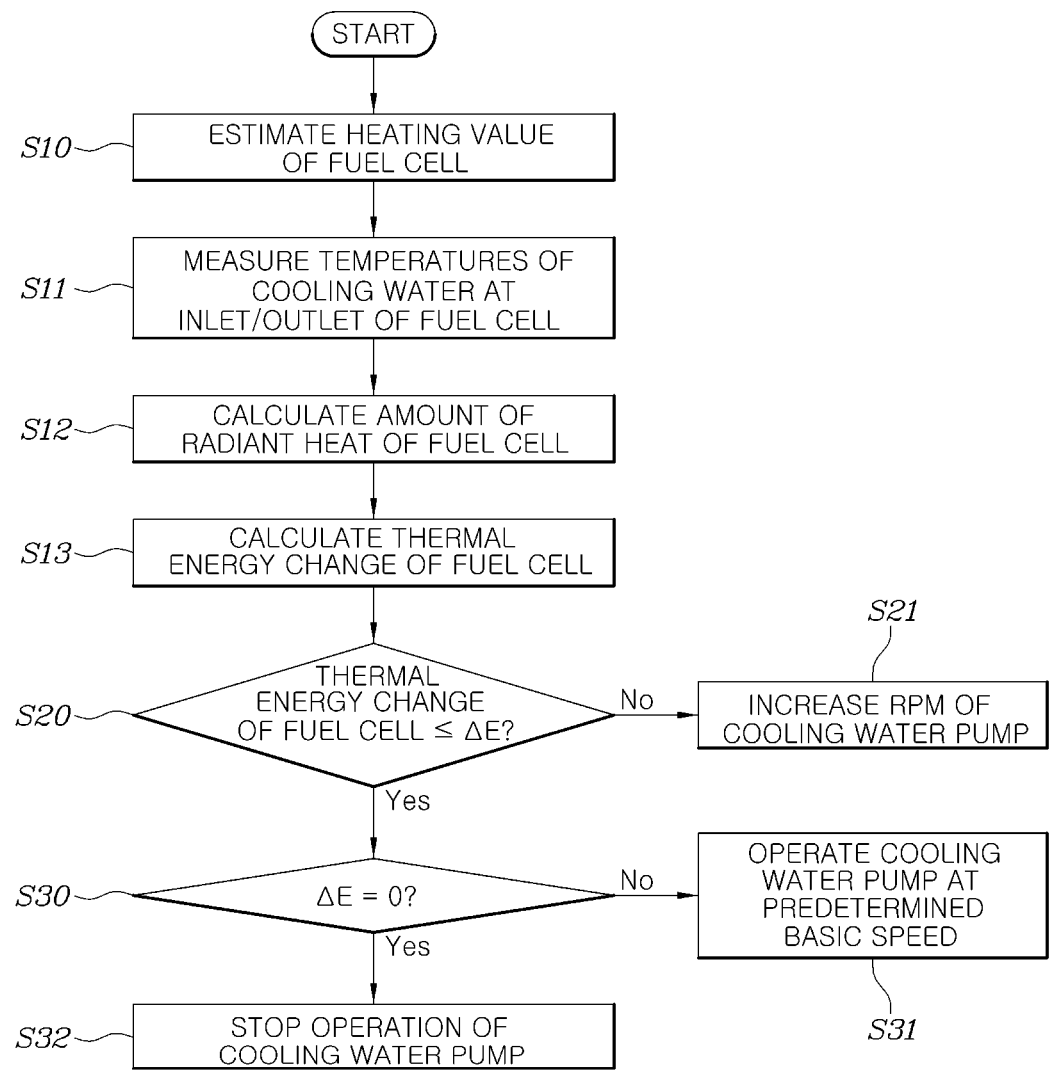
FIG. 2 is a flowchart illustrating a cooling control method for fuel cells in accordance with one exemplary embodiment of the present invention.
Figure 3:
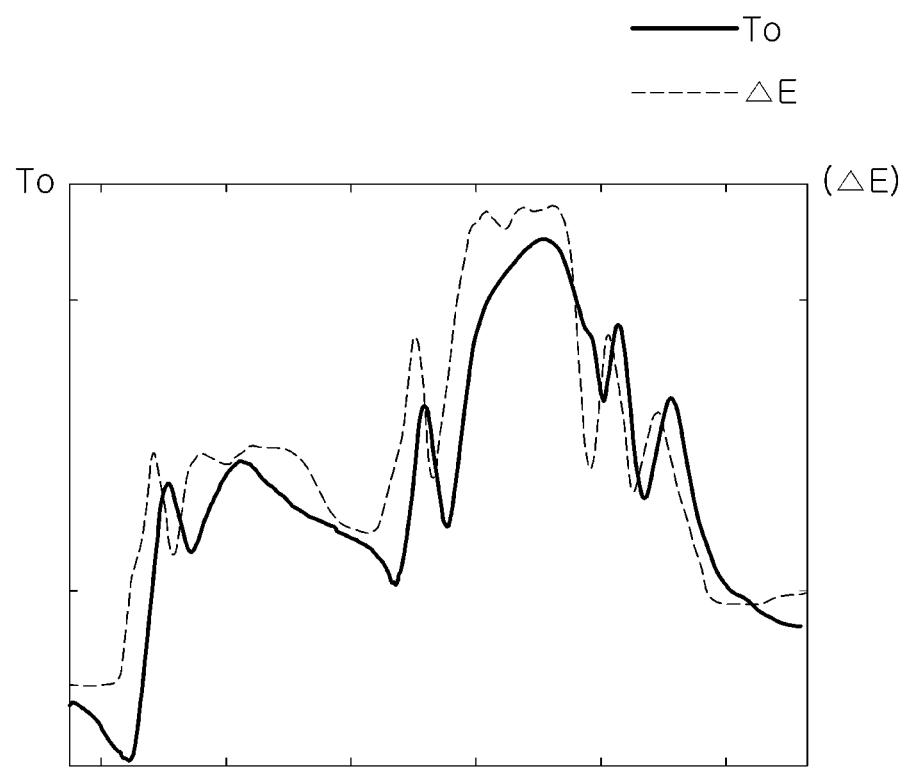
FIG. 3 is a graph representing a temperature change of cooling water at an outlet of a cooling circulation line of a fuel cell and a thermal energy change of the fuel cell in accordance with one exemplary embodiment of the present invention.
Figure 4:
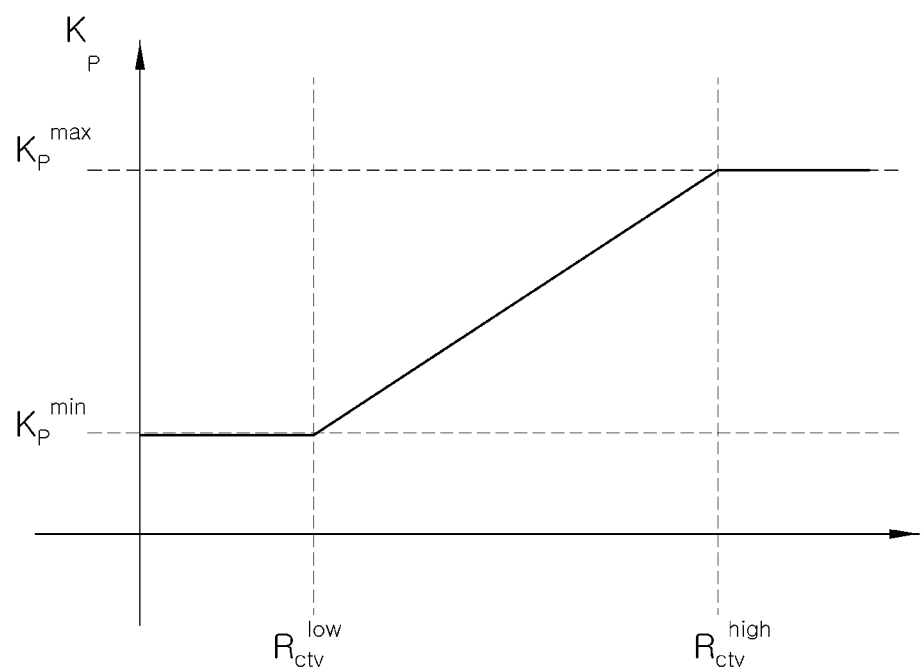
FIG. 4 is a graph representing a control gain value for controlling a cooling water pump according to an opening degree of a thermostat valve in accordance with one exemplary embodiment of the present invention.
Figure 5:
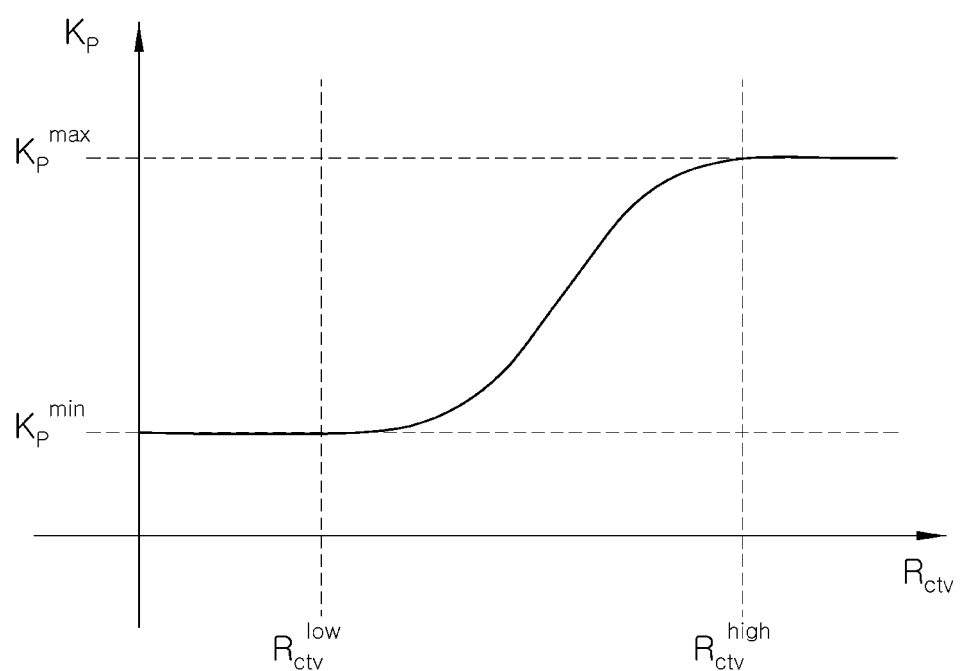
FIG. 5 is a graph representing a variable equation of the control gain value shown in FIG. 4 in accordance with one exemplary embodiment of the present invention.

FIG. 1 is a block diagram of a cooling control system for fuel cells 10 in accordance with one exemplary embodiment of the present invention. FIG. 2 is a flowchart illustrating a cooling control method for fuel cells 10 in accordance with one exemplary embodiment of the present invention. FIG. 3 is a graph representing a temperature change of cooling water at an outlet of a cooling circulation line 20 of a fuel cell 10 and a thermal energy change of the fuel cell 10. FIG. 4 is a graph representing a control gain value for controlling a cooling water pump 30 according to an opening degree of a thermostat valve 100. FIG. 5 is a graph representing a variable equation of the control gain value shown in FIG. 4. Notably, the units described herein may be operated by a controller having a memory and processor.

Referring to FIGS. 1 to 5, the cooling control system for fuel cells in accordance with one exemplary embodiment of the present invention may include the fuel cell 10, the cooling circulation line 20 connected to the fuel cell 10 to circulate cooling water for cooling the fuel cell 10 therein, the cooling water pump 30 provided on the cooling circulation line 20 to adjust an amount of circulation of cooling water, the calculation unit 40 configured to calculate a thermal energy change of the fuel cell 10 based on a heating value and an amount of radiant heat of the fuel cell 10, and the controller 50 configured to operate the cooling water pump 30 based on the thermal energy change of the fuel cell 10 calculated by the calculation unit 40.

The cooling control system for fuel cells may further include the heating value estimation unit 60 configured to estimate the heating value of the fuel cell 10 based on electric power generation information of the fuel cell 10. Additionally, the cooling control system may include a first temperature sensor 70 and a second temperature sensor 80 configured to measure temperatures of cooling water at an inlet and an outlet where the cooling circulation line 20 and the fuel cell 10 are connected.

Referring to FIG. 1, the controller 50, the calculation unit 40, the heating value estimation unit 60, the cooling water pump 30, the first temperature sensor 70, the second temperature sensor 80 and the fuel cell 10 may be connected by control lines which are indicated by a dotted line.

The controller 50 may be configured to adjust the flow rate of cooling water in the cooling circulation line 20 by adjusting the rotational speed of the cooling water pump 30 to thus adjust the temperature of the fuel cell 10. The calculation unit 40 may be configured to calculate the amount of radiant heat of the fuel cell 10 based on the temperatures measured by the first temperature sensor 70 and the second temperature sensor 80, and calculate the thermal energy change of the fuel cell 10 based on a value acquired by subtracting the amount of radiant heat of the fuel cell 10 from the heating value of the fuel cell 10.

The calculation unit 40 may be configured to calculate the thermal energy change using the following equation.

$$\Delta E = \int (\dot{Q}_{gen} - \dot{Q}_{disp}) dt = \int \dot{Q}_{gen} - c_{clnt} \dot{w}_{clnt} (T_o - T_i) dt$$

wherein, $\Delta E$ is the thermal energy change, $\dot{Q}_{gen}$ is the heating value of the fuel cell 10, and $\dot{Q}_{disp}$ is the amount of radiant heat of the fuel cell 10. $T_o$ is the temperature of the outlet of the cooling circulation line 20 of the fuel cell 10, $T_i$ is the temperature of the inlet of the cooling circulation line 20 of the fuel cell 10, $c_{clnt}$ is the specific heat of cooling water, and $\dot{w}_{clnt}$ is the flow rate of cooling water passing through the fuel cell 10. The thermal energy change of the fuel cell 10 may be acquired by calculating the thermal energy change using the above equation.

In FIG. 3, $T_o$ represents a temperature change of cooling water at the outlet of the cooling circulation line 20 of the fuel cell 10, and $\Delta E$ represents a thermal energy change of the fuel cell 10. Referring again to FIG. 3, it may be confirmed that the thermal energy change of the fuel cell 10 rather than the temperature change of cooling water at the outlet of the cooling circulation line 20 of the fuel cell 10 instantly reacts to heating. Therefore, when the cooling water pump 30 is operated based on the thermal energy change of the fuel cell 10, cooling of the fuel cell 10 may be performed more effectively.

The cooling control system for fuel cells may further include a heat exchanger 90 provided on the cooling circulation line 20 to exchange heat between cooling water in the cooling circulation line 20 and the outside, a bypass path 21 included in the cooling circulation line 20 to allow the cooling water therein to bypass the heat exchanger 90, and a thermostat valve 100 configured to adjust an amount of circulation of the cooling water circulated to the heat exchanger 90 or the bypass path 21 based on the temperature of the cooling water in the cooling circulation line 20.

The fuel cell 10, the cooling water pump 30, the first temperature sensor 70, the second temperature sensor 80, the heat exchanger 90 and the thermostat valve 100 may be connected by the cooling circulation line 20. The thermostat valve 100 may be operated in an electronic manner, and has a similar structure to a throttle valve of an internal combustion engine vehicle. The thermostat valve 100 may adjust the temperature of cooling water flowing into the inlet of the cooling circulation line 20 of the fuel cell 10 by adjusting the flow rate of cooling water of the heat exchanger 90 and the flow rate of cooling water of the bypass path 21 through an adjustment in the opening degree of the thermostat valve 100.

The controller 50 may be configured to operate the cooling water pump 30 based on the opening degree of the thermostat valve 100 and the thermal energy change of the fuel cell 10. Additionally, the controller 50 may be configured to operate the cooling water pump 30 to maintain a predetermined basic speed, and increase the flow rate of cooling water when the thermal energy change of the fuel cell 10 is increased to prevent excessive increase of the internal temperature of the fuel cell 10.

When the opening degree of the thermostat valve 100 is increased, the flow rate of the cooling water of the heat exchanger 90 is increased. Therefore, the temperature of the cooling water in the cooling circulation line 20 may be decreased, and the internal temperature of the fuel cell 10 may be decreased. As the opening degree of the thermostat valve 100 approaches the maximum value, a cooling margin to decrease the internal temperature of the fuel cell 10 is insufficient. In particular, the amount of radiant heat of the fuel cell 10 due to the cooling water pump 30 may be increased by increasing the rotational speed of the cooling water pump 30, as needed. On the contrary, as the opening degree of the thermostat valve 100 decreases, the cooling margin using the thermostat valve 100 may increase, and thus, the rotational speed of the cooling water pump 30 may be decreased.

The controller 50 may be configured to operate the cooling water pump 30 by adjusting a control gain value which adjusts the rotational speed of the cooling water pump 30 based on the opening degree of the thermostat valve 100, and the thermostat valve 100 may set the opening degree thereof based on the temperature of the fuel cell 10. In addition, the controller 50 may be configured to operate the cooling water pump 30 using proportional control (P control). A control algorithm is expressed in the following equation.

$$RPM_{cps} = K_p s(\Delta E - \Delta E_{thres})$$

wherein, $RPM_{cps}$ indicates the rotational speed of the cooling water pump 30, $K_p$ indicates the control gain value, $\Delta E$ indicates the thermal energy change of the fuel cell 10, and $\Delta E_{thres}$ indicates a predetermined thermal energy change value.

Referring to FIG. 4, it may be confirmed that $R_{ctv}$ is an opening degree rate of the thermostat valve 100, the opening degree rate is a value acquired by dividing a current opening degree value by the maximum opening degree value, and the value of $K_p$ is set depending on the opening degree rate $R_{ctv}$ of the thermostat valve 100. $R_{ctv}^{low}$ is an opening degree rate value of the thermostat valve 100 in a state in which the current opening degree value is the minimum opening degree value, and $R_{ctv}^{high}$ is an opening degree rate value of the thermostat valve 100 in a state in which the current opening degree value is the maximum opening degree value.

Further, FIG. 5 is a graph representing a variable equation of the control gain value $K_p$ shown in FIG. 4. Referring to FIG. 5, the controller 50 may be configured to operate the cooling water pump 30 to adjust the rotational speed of the cooling water pump 30 to become the predetermined basic speed, when the thermal energy change of the fuel cell 10 is the predetermined thermal energy change value or less.

When the value of the thermal energy change $\Delta E$ of the fuel cell 10 is the predetermined thermal energy change value $\Delta E_{thres}$ or less, the value of $\Delta E - \Delta E_{thres}$ becomes a negative value, and the control algorithm may be executed to operate the cooling water pump 30 at the predetermined basic speed. The controller 50 may be configured to stop operation of the cooling water pump 30, when the thermal energy change of the fuel cell 10 is the predetermined thermal energy change value or less.

For example, when the predetermined thermal energy change value $\Delta E_{thres}$ is set to 0, the value of $\Delta E - \Delta E_{thres}$ becomes a negative value and the control algorithm is executed to stop operation of the cooling water pump 30. By stopping operation of the cooling water pump 30, power consumption may be reduced and fuel efficiency of the fuel cell 10 may be improved. The controller 50 may be configured to operate the cooling water pump 30 to increase the rotational speed of the cooling water pump 30 in proportion to the control gain value, when the thermal energy change of the fuel cell 10 exceeds the predetermined thermal energy change value.

When the thermal energy change value $\Delta E$ exceeds the predetermined thermal energy change value $\Delta E_{thres}$, the control algorithm may be executed to operate the cooling water pump 30 by calculating the rotational speed of the cooling water pump 30 based on the control gain value $K_p$. By operating the cooling water pump 30 using the thermal energy change of the fuel cell 10 and adjusting the opening degree of the thermostat valve 100, preemptive cooling control for preventing excessive increase of the internal temperature of the fuel cell 10 may be achieved.

Referring further to FIG. 2, a cooling control method for fuel cells in accordance with one exemplary embodiment of the present invention may include calculating a thermal energy change of the fuel cell 10 based on an amount of radiant heat and a heating value of the fuel cell 10 (operations S12 and S13), and operating the cooling water pump 30 based on the thermal energy change of the fuel cell 10, calculated in the calculation of the thermal energy change of the fuel cell 10 (operations S12 and S13), and adjusting an opening degree of the thermostat valve 100 (operations S20, S21, S30, S31 and S32).

The cooling control method for fuel cells may further include estimating the heating value of the fuel cell 10 based on electric power generation information of the fuel cell 10 (operation S10). In addition, the cooling control method may include measuring temperatures of cooling water at the inlet and the outlet where the cooling circulation line 20 and the fuel cell 10 are connected (operation S11).

In the calculation of the thermal energy change of the fuel cell 10 (operations S12 and S13), the amount of radiant heat of the fuel cell 10 may be calculated based on the temperatures measured in the measurement of the temperatures of cooling water (operation S11), and the thermal energy change of the fuel cell 10 may be calculated based on a value acquired by subtracting the amount of radiant heat of the fuel cell 10 from the heating value of the fuel cell 10.

In the operation of the cooling water pump 30 (operations S20, S21, S30, S31 and S32), the cooling water pump 30 may be operated by adjusting the control gain value for adjusting the rotational speed of the cooling water pump 30 based on the opening degree of the thermostat valve 100. In addition, in the operation of the cooling water pump 30 (operation S31), the cooling water pump 30 may be operated to adjust the rotational speed of the cooling water pump 30 to become the predetermined basic speed, when the thermal energy change of the fuel cell 10 is the predetermined thermal energy change value or less.

The controller 50 may be configured to stop operation of the cooling water pump 30, when the thermal energy change of the fuel cell 10 is the predetermined thermal energy change value or less and the predetermined thermal energy change value is 0. In addition, in the operation of the cooling water pump 30 (operation S21), the cooling water pump 30 may be operated to increase the rotational speed of the cooling water pump 30 in proportion to the control gain value, when the thermal energy change of the fuel cell 10 exceeds the predetermined thermal energy change value.

As is apparent from the above description, a cooling control system for fuel cells in accordance with one exemplary embodiment of the present invention may be configured to operate a cooling water pump based on a thermal energy change of a fuel cell and an opening degree of a thermostat valve, thereby being capable of preventing excessive increase of the internal temperature of the fuel cell. Further, the opening degree of the thermostat valve may be preemptively adjusted prior to the rotational speed of the cooling water pump, and thus, improvement in fuel efficiency due to decrease in power consumption may be achieved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling control system for fuel cells, comprising:
   a fuel cell;
   a cooling circulation line connected to the fuel cell to circulate cooling water for cooling the fuel cell therein;
   a cooling water pump provided on the cooling circulation line to adjust a circulation amount of the cooling water;
   a calculation unit configured to calculate a thermal energy change of the fuel cell based on a heating value and an amount of radiant heat of the fuel cell;
   a controller configured to operate the cooling water pump based on the calculated thermal energy change of the fuel cell;
   a first temperature sensor configured to measure a temperature of the cooling water at an inlet where the cooling circulation line and the fuel cell are connected; and
   a second temperature sensor configured to measure a temperature of the cooling water at an outlet where the cooling circulation line and the fuel cell are connected,
   wherein the calculation unit is configured to calculate the amount of radiant heat of the fuel cell based on a difference between the temperature measured by the first temperature sensor and the temperature measured by the second temperature sensor, and calculate the thermal energy change of the fuel cell based on a value acquired by subtracting the amount of radiant heat of the fuel cell from the heating value of the fuel cell.

2. The cooling control system for fuel cells according to claim 1, further comprising:
   a heating value estimation unit configured to estimate the heating value of the fuel cell based on electric power generation information of the fuel cell.

3. The cooling control system for fuel cells according to claim 1, further comprising:
   a heat exchanger provided on the cooling circulation line to exchange heat between the cooling water in the cooling circulation line and the outside;
   a bypass path provided in the cooling circulation line to allow the cooling water therein to bypass the heat exchanger; and
   a thermostat valve configured to adjust an amount of circulation of the cooling water circulated to the heat exchanger or the bypass path,
   wherein the controller is configured to operate the cooling water pump based on an opening degree of the thermostat valve and the thermal energy change of the fuel cell.

4. The cooling control system for fuel cells according to claim 3, wherein the controller is configured to operate the cooling water pump by adjusting a control gain value for adjusting a rotational speed of the cooling water pump based on the opening degree of the thermostat valve.

5. The cooling control system for fuel cells according to claim 3, wherein an opening degree of the thermostat valve is set based on an internal temperature of the fuel cell.

6. The cooling control system for fuel cells according to claim 1, wherein the controller is configured to operate the cooling water pump to adjust a rotational speed of the cooling water pump to become a predetermined basic speed when the thermal energy change of the fuel cell is a predetermined thermal energy change or less.

7. The cooling control system for fuel cells according to claim 1, wherein the controller is configured to stop operation of the cooling water pump when the thermal energy change of the fuel cell is a predetermined thermal energy change or less and the predetermined thermal energy change is 0.

8. The cooling control system for fuel cells according to claim 1, wherein the controller is configured to increase a rotational speed of the cooling water pump when the thermal energy change of the fuel cell exceeds a predetermined thermal energy change.

9. A cooling control method for fuel cells, comprising:
   calculating, by a controller, a thermal energy change of a fuel cell based on an amount of radiant heat and a heating value of the fuel cell;
   operating, by the controller, a cooling water pump based on the calculated thermal energy change of the fuel cell and adjusting an opening degree of a thermostat valve;
   measuring, by a first temperature sensor, a temperature of the cooling water at an inlet where a cooling circulation line and the fuel cell are connected; and
   measuring, by a second temperature sensor, a temperature of the cooling water at an outlet where the cooling circulation line and the fuel cell are connected,
   wherein, in calculating the thermal energy change, the amount of radiant heat of the fuel cell is calculated based on a difference between the temperature measured by the first temperature sensor and the temperature measured by the second temperature sensor, and the thermal energy change of the fuel cell is calculated based on a value acquired by subtracting the amount of radiant heat of the fuel cell from the heating value of the fuel cell.

10. The cooling control method for fuel cells according to claim 9, further comprising;
   estimating, by the controller, the heating value of the fuel cell based on electric power generation information of the fuel cell.

11. The cooling control method for fuel cells according to claim 9, wherein, in operating the cooling water pump, the cooling water pump is operated by adjusting a control gain value for adjusting a rotational speed of the cooling water pump based on the opening degree of the thermostat valve.

12. The cooling control method for fuel cells according to claim 11, wherein, in operating the cooling water pump, the cooling water pump is operated to increase the rotational speed of the cooling water pump when the thermal energy change of the fuel cell exceeds a predetermined thermal energy change.

13. The cooling control method for fuel cells according to claim 9, wherein, in operating the cooling water pump, the cooling water pump is operated to adjust a rotational speed of the cooling water pump to become a predetermined basic speed when the thermal energy change of the fuel cell is a predetermined thermal energy change or less.

14. The cooling control method for fuel cells according to claim 9, wherein, in operating the cooling water pump, the cooling water pump is operated to stop operation of the cooling water pump when the thermal energy change of the fuel cell is a predetermined thermal energy change or less and the predetermined thermal energy change is 0.

\* \* \* \* \*